United States Patent [19]  
Lekarev et al.

[11] 4,085,025
[45] Apr. 18, 1978

[54] APPARATUS FOR ELECTROCHEMICAL MACHINING OF WORKPIECES

[76] Inventors: Zinovy Abramovich Lekarev, ulitsa Trinklera, 20, kv. 71; Pavel Semenovich Razdymakha, ulitsa Bljukhera, 26, kv. 121; Vladimir Nikolaevich Davydov, ulitsa Gvardeitsev Shironintsev, 11, kv. 13; Vladillen Antonovich Shaforostov, ulitsa Bairona, 138a, kv. 28; Leonid Pavlovich Kolosov, ulitsa Somovskaya, 37/39, kv. 24; Vladimir Isaakovich Suslin, ulitsa Frunze, 17, kv. 46; Boris Anatolievich Makeev, ulitsa Novgorodskaya, 6, kv. 29; Alexandr Ivanovich Dubovik, ulitsa Gvardeitsev Shironintsev, 63a, kv. 22; Anatoly Alexeevich Kolesnichenko, ulitsa Oktyabrskoi Revoljutsii, 36, kv. 11; Alexandr Ivanovich Etnaer, ulitsa Derevyanko, 24, kv. 2; Vitaly Alexandrovich Pilipenki, ulitsa Vorobieva, 15/19, kv. 2, all of Kharkov, U.S.S.R.

[21] Appl. No.: 823,861

[22] Filed: Aug. 11, 1977

[51] Int. Cl.² .......................... B23P 1/04; B23P 1/12

[52] U.S. Cl. ........................ 204/224 M; 204/225; 204/278

[58] Field of Search .................. 204/224 M, 278, 225

[56] References Cited

U.S. PATENT DOCUMENTS

| 3,002,907 | 10/1961 | Williams | 204/224 M X |
| 3,276,988 | 10/1966 | Williams | 204/224 M X |
| 3,449,226 | 6/1969  | Williams | 204/224 M X |

Primary Examiner—John H. Mack  
Assistant Examiner—D. R. Valentine  
Attorney, Agent, or Firm—Robert E. Burns; Emmanuel J. Lobato; Bruce L. Adams

[57] ABSTRACT

Apparatus for electrochemical machining of workpieces, comprising an electrolyte splashing-preventing device comprising a protective casing mounted on a movable crossbeam and connected with the exhaust pipe of an exhaust device, likewise mounted on the movable crossbeam and connected telescopingly with a ventilation conduit for movement therein against an abutment to close off the ventilation conduit when the electrode is retracted from the workpiece being machined.

4 Claims, 5 Drawing Figures

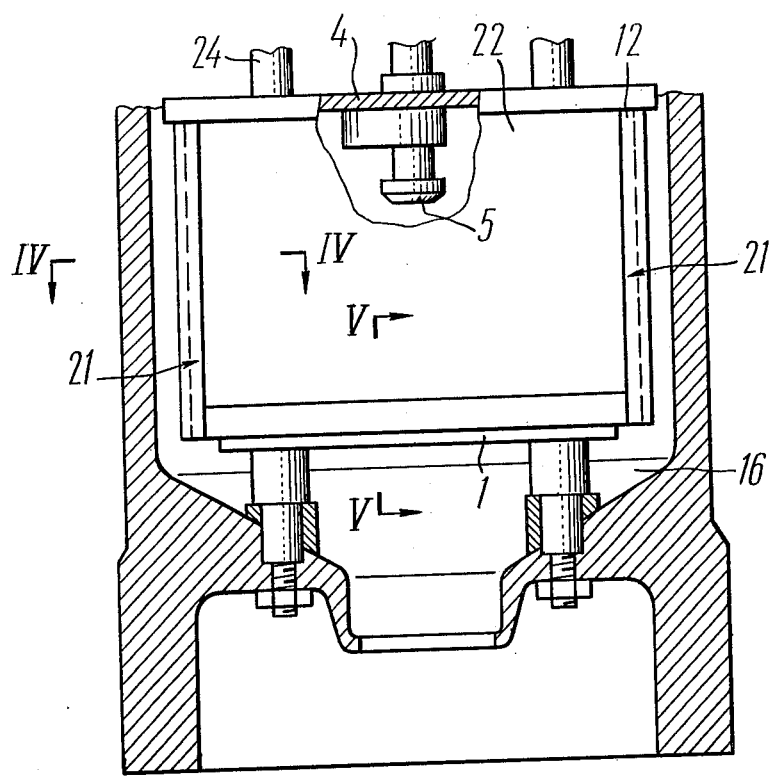
FIG. 3
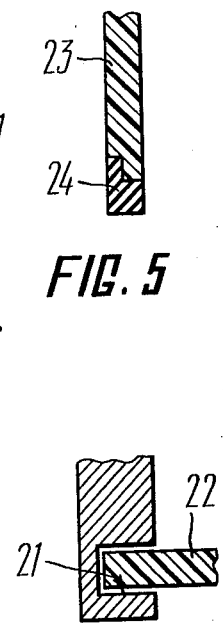
FIG. 5
FIG. 4

APPARATUS FOR ELECTROCHEMICAL MACHINING OF WORKPIECES

BACKGROUND OF THE INVENTION

The present invention relates to electrochemical machining of workpieces and, more particularly, it relates to apparatus for electro-erosive or electrical discharge machining of workpieces. The invention can be utilized in electrochemical machining, copying and piercing machines, as well as in burring machines.

All the above mentioned types of machines have protective devices or guards to protect the operator and to minimize the waste of the electrolyte, caused by splashing and evaporation.

It is a known practice to have protective boards or guards mounted in the front part of a burring machine, which boards or guards are manually closed before a working cycle is started.

In other known cases, the protecting device includes a casing directly connected with the electrode and movable jointly therewith.

In the last-mentioned structure exhaust ventilation can be effected exclusively with aid of a suction exhaust hood overlying the machine, which, however, would not afford reliably enough protection of the operator from toxic vapors and fumes produced during the working operation; moreover, the structure calls for a relatively high capacity of the suction exhaust system. Besides, this structure creates draft-like air streams about the operator, which impairs the sanitary conditions of the latter's work.

There is further known an apparatus for electrochemical machining of workpieces, comprising a work table, a stationary crossbeam and a movable one, an exhaust device and an electrolyte splashing-preventing device. The movable crossbeam with the electrode secured thereon is movable toward a workpiece to be machined, accommodated in a device fastened on the work table, under the action of a drive mounted on the stationary crossbeam, with the electrode thus being moved toward and away from the workpiece. The exhaust device is communicated with the ventilation conduit.

This last-described structure in multi-station arrangements for electrochemical machining of workpieces is operable only with the capacity of the exhaust device being stepped up as many times as there are the stations in the arrangement. Furthermore, the exhaust device is operative also while the workpieces are either positioned or removed, creating draft-like air streams about the operator. Among the disadvantages of the structure is the fact that the guard door is to be opened and closed when the workpieces are either positioned or removed.

SUMMARY OF THE INVENTION

It is an object of the present invention to provide an apparatus for electrochemical machining of workpieces, which should afford adequate protection of the operator from vapors and fumes produced by the working process and from splashes of electrolyte.

It is another object of the present invention to provide an apparatus which should provide for optimal utilization of the capacity of the exhaust ventilation fan.

It is still another object of the present invention to provide an apparatus wherein formation of air streams about the operator should be prevented.

These and other objects are attained in an apparatus for electrochemical machining of workpieces, comprising at least one work table adapted to have mounted thereon a device adapted to accommodate a workpiece to be machined, a stationary crossbeam with an electrode secured thereon, adapted to be reciprocated to move the electrode toward and away from the workpiece under the action of a drive mounted on a stationary crossbeam, an exhaust device connected with a ventilation conduit and an electrolyte splashing-preventing device, in which apparatus, in accordance with the present invention, the splashing-preventing device includes a protective casing mounted on the movable crossbeam and connected with the exhaust pipe of the exhaust device, likewise mounted on the movable crossbeam and telescopingly connected with the ventilation conduit for motion therein against an abutment means, to close off the ventilation conduit when the electrode is moved away from the workpiece.

It is expedient that the lower part of the protective casing should be shaped to enclose therein the work table with a gap left therebetween to provide for draining of the electrolyte, and to be telescopingly receivable in a collector trough, as the electrode is brought to the workpiece.

In one embodiment of the present invention the protective casing is provided with guideways, the front wall thereof being movable along these guideways.

The herein disclosed apparatus affords simultaneous protection of the operator from vapors and fumes produced during the working process, from splashes of the electrolyte and from air streams. Furthermore, since in the presently disclosed apparatus the internal space of the exhaust pipe is closed off for the period of recharging the work chamber, with the exhaust action being discontinued, there is created a possibility of optimal utilization of the capacity of the exhaust fan, particularly, in multi-station arrangement for electrochemical machining of workpieces.

BRIEF DESCRIPTION OF THE DRAWINGS

Other objects and advantages of the present invention will become apparent from the following description of embodiments thereof, with reference being had to the accompanying drawings, wherein:

FIG. 3 is a partly sectional view of a similar apparatus having a movable front wall of the protective casing, in accordance with the invention;

FIG. 4 is a sectional view taken on line IV—IV of FIG. 3;

FIG. 5 is a a sectional view taken on line V—V of FIG. 3.

DESCRIPTION OF THE PREFERRED EMBODIMENTS

Figure 1:
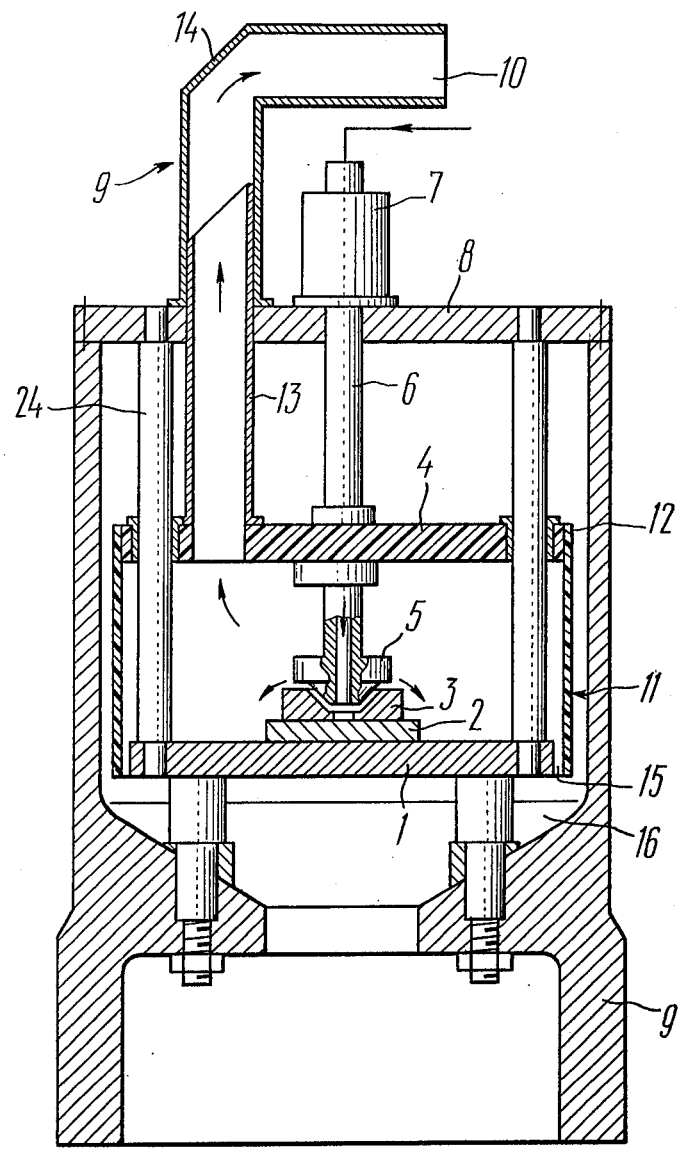
FIG. 1 is a sectional view of an appparatus for electrochemical machining of workpieces, according to the invention.

Referring now in particular to the appended drawings, the apparatus for electrochemical machining of workpieces comprises a work table 1 (FIG. 1) having mounted thereon a device 2 adapted to accommodate a workpiece 3 to be machined.

The apparatus further comprises a movable crossbeam 4 with an electrode 5 secured thereon. The movable crossbeam 4 is operatively connected with the piston rod 6 of an air cylinder 7 which is adapted to drive the crossbeam 4 and is mounted on a stationary crossbeam 8.

The apparatus also comprises an exhaust device 9 connected to a ventilation conduit 10. The movable crossbeam 4 has mounted thereon a device 11 for preventing splashing of the electrolyte made in the form of a protective casing 12 mounted on the movable crossbeam 4 and connected with the exhaust pipe 13 of the exhaust device 9. The exhaust pipe 13 is mounted on the movable crossbeam 4 and is telescopingly connected with the ventilation conduit 10. The exhaust pipe 13 is thus mounted for motion within the ventilation conduit 10 into a position where it abuts against the abutment 14, to close off the said ventilation conduit 10 when the electrode 5 is retracted from the workpiece 3.

The lower part of the protective casing 12 encloses therein the work table 1 with a gap 15 left therebetween, to provide for draining of the electrolyte, and is receivable in the electrolyte collector trough 16, as the electrode 5 is moved toward the workpiece 3.

Figure 2:
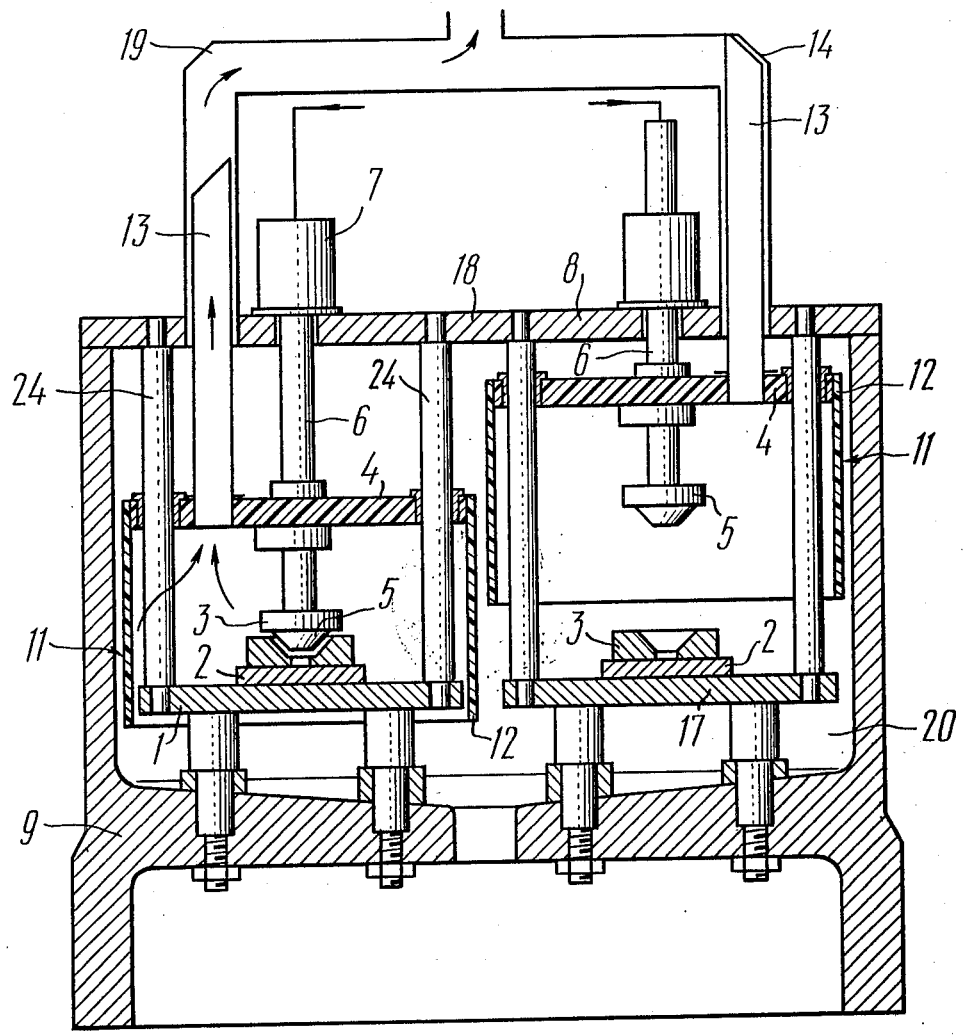
FIG. 2 is a sectional view of an apparatus similar to the one illustrated in FIG. 1, with two work-accommodating tables.

Shown in FIG. 2 is an embodiment of the herein disclosed apparatus in an arrangement with two work tables 1 and 17. Each work table 1 and 17 is provided with its own respective electrolyte splashing-preventing device 11, the respective driving air cylinders 7 of the tables 1 and 17 being mounted on a single stationary crossbeam 18. The respective exhaust pipes 13 are associated with the common single ventilation conduit 19. The work tables 1 and 17 are mounted above the single common electrolyte collector trough 20.

The protective casing 12 (FIGS. 3 and 4) is provided with guideways 21 which receive its reciprocable front wall 22. To enhance the safety of operation, the bottom edge 23 (FIG. 5) of the front wall 22 is provided with an elastic end piece 24.

The movable crossbeam 4 (FIGS. 1, 2) is reciprocated by the piston rod 6 along guides 21.

The herein disclosed apparatus for electrochemical machining of workpieces operates, as follows.

A workpiece 3 (FIG. 2) is mounted on the work table 1 in the device 2. Meanwhile, the movable crossbeam 8 with the electrode 5 and the protective casing 12 are held in the inoperative position, to afford access for charging the workpiece 3. The exhaust pipe 13 engages the abutment 14, closing off the ventilation conduit 10. The electrolyte is not supplied into the working zone, and the electrode 5 is deenergized.

With the workpiece 3 positioned, the air cylinder 7 is operated for the piston rod 6 thereof to drive the movable crossbeam 4 with the electrode 5 and the protective casing 12 into the operative position where a necessary working clearance is afforded between the workpiece 3 and the electrode 5, through which the electrolyte is forced.

The exhaust pipe 13 clears the abutment 14, so that vapors and fumes are exhausted from the working zone, while the protective casing 12 has its lower part enclosing therein the work table 1 with the gap 15 left therebetween, to provide for draining of the electrolyte into the trough 16. Voltage is supplied across the workpiece 3 and the electrode 5, and the electrochemical machining is performed. With the machining completed, the air cylinder 7 is operated for the piston rod 6 to drive the movable crossbeam 4 with the electrode 5 and the protective casing 12 into the inoperative position, so that the workpiece 3 can be removed.

In this position the exhaust pipe 13 closes off the ventilation conduit 10. The supply of voltage and of the electrolyte is discontinued.

In the embodiment of the herein disclosed apparatus in the arrangement illustrated in FIG. 2, the workpiece 3 on the work table 1 is being machined, while a workpiece is removed from the table 17, and a new workpiece is mounted in its place, and vice versa. In the operating station vapors and fumes are exhausted from the working zone into the common ventilation conduit 19, and the electrolyte is drained into the common collector trough 20.

In the inoperative station the exhaust action is cut off, and the electrolyte is not supplied.

To ensure safety of the operator in case of unexpected lowering of the crossbeam 4 with the protective casing 12, the structure is such that in this case the front wall 22 (FIG. 3) abuts against the operator's hands by its elastic end piece or tip 24 and is thus arrested in its downward motion.

What is claimed is:

1. An apparatus for electrochemical machining of workpieces, comprising:
    at least one work table;
    a device to accommodate a workpiece to be machined, securable on a respective work table;
    an electrode tool for performing machining of the workpiece;
    a movable crossbeam having said electrode tool secured thereon;
    a drive to effect reciprocation of said movable crossbeam, to bring said electrode tool toward and away from the workpiece;
    a stationary crossbeam having said drive mounted thereon;
    a ventilation conduit;
    an exhaust device for withdrawing vapors and fumes produced in the process of electrochemical machining of workpieces from the working zone;
    an exhaust pipe of said exhaust device, mounted on said movable crossbeam and telescopingly connected with said ventilation conduit for motion therein;
    abutment means accommodated in said ventilation conduit, to provide for closing off said ventilation conduit, when said electrode tool is retracted from the workpiece;
    an electrolyte splashing-preventing device, including a protective casing, and protective casing being mounted on said movable crossbeam and connected with said exhaust pipe.

2. An apparatus as set forth in claim 1, comprising an electrolyte-collecting trough for collecting the electrolyte when said electrode tool is brought toward the workpiece being machined, a lower part of said protective casing being shaped to enclose therein said work table with a gap left therebetween, providing for draining of the electrolyte, and said lower part of said protective casing being telescopingly receivable in said electrolyte-collecting trough.

3. An apparatus as set forth in claim 1, comprising guideways provided on and said protective casing, said protective casing having a front wall movable in said guideways.

4. An apparatus as claimed in claim 2, comprising guideways provided on said protective casing, and said protective casing having a front wall movable in said guideways.

* * * * *